United States Patent [19]
Getz

[11] 3,824,048
[45] July 16, 1974

[54] TIRE HOLDER AND HANDLER
[75] Inventor: Gary R. Getz, Norton, Ohio
[73] Assignee: McNeil Corporation, Akron, Ohio
[22] Filed: Aug. 2, 1972
[21] Appl. No.: 277,317

[52] U.S. Cl. .............................. 425/28 R, 425/52
[51] Int. Cl. .................................... B29h 5/02
[58] Field of Search ............. 425/28, 29, 30, 31, 32, 425/33, 34, 35, 48, 52, 36, 38, 43, 58

[56] References Cited
UNITED STATES PATENTS

| | | | |
|---|---|---|---|
| 2,747,225 | 5/1956 | Zona | 425/31 |
| 2,763,317 | 9/1956 | Ostling et al. | 425/52 X |
| 2,824,336 | 2/1958 | Weigold et al. | 425/31 |
| 2,970,342 | 2/1961 | Frohlich et al. | 425/33 |
| 3,298,066 | 1/1967 | Soderquist | 425/32 |
| 3,342,663 | 9/1967 | Pouilloux | 425/43 X |
| 3,683,981 | 8/1972 | Bronick | 425/36 X |
| 3,690,795 | 9/1972 | Yoshida et al. | 425/58 |

Primary Examiner—J. Howard Flint, Jr.
Attorney, Agent, or Firm—Hamilton, Renner & Kenner

[57] ABSTRACT

A holder for a radial or partially shaped tire having a support member or post which carries a plate for receiving the lower bead of the uncured tire. An expansible member is carried by the post in a manner such that the tire may be placed over the expansible member and onto the lower bead supporting plate. The expansible member is then inserted into the tire so that substantially the entire inner portion of the tire is contacted by the member. Means can be provided at each tire curing press to hold the post and actuate the expansible member and/or such can be provided at the location where the tire is built so as to immediately hold the tire in the desired shape prior to transfer to the tire curing press.

13 Claims, 5 Drawing Figures

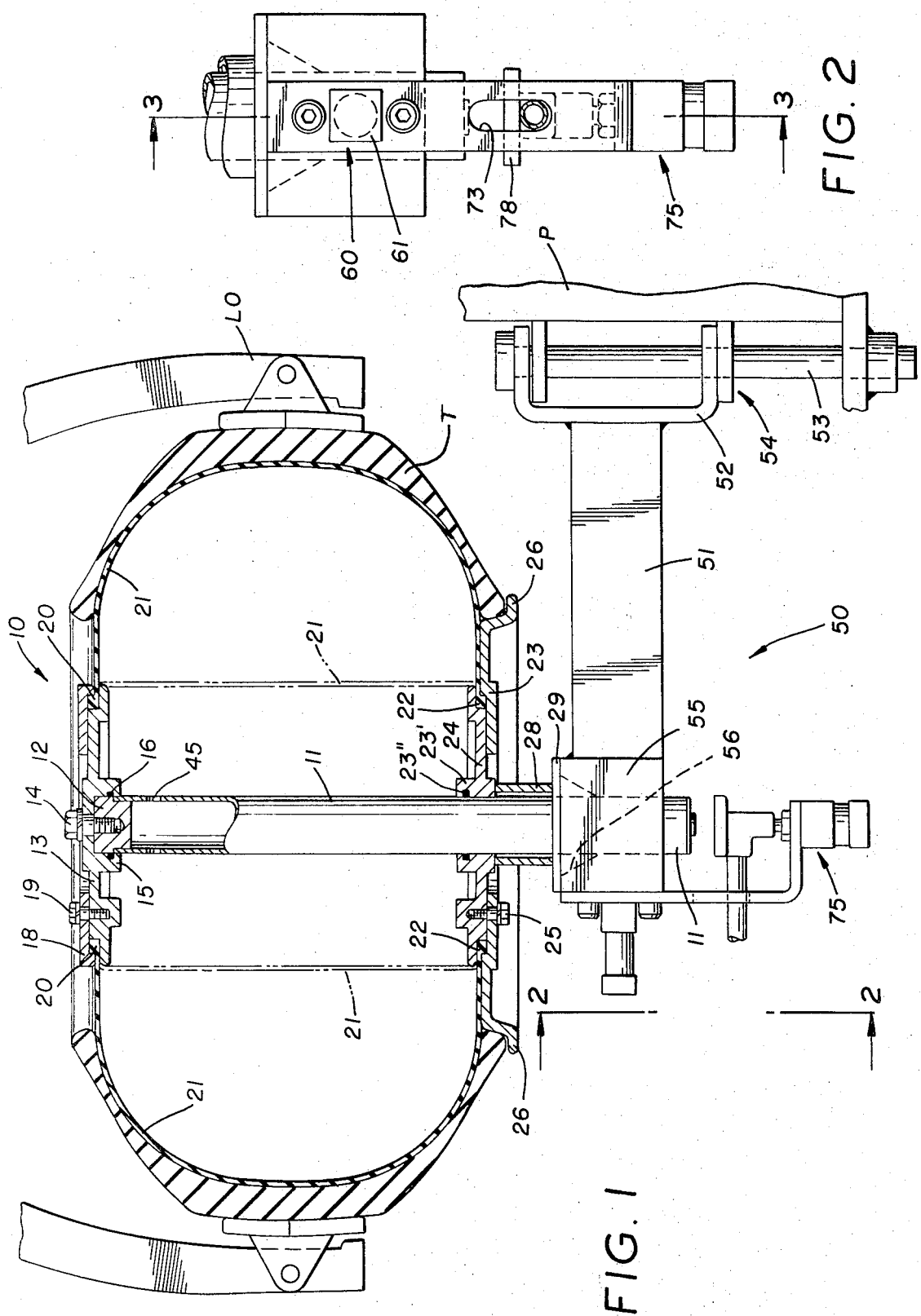

TIRE HOLDER AND HANDLER

BACKGROUND OF THE INVENTION

This invention relates to a device for holding and handling green tires after they are built or fabricated and prior to curing in a conventional vulcanizing press. More particularly, this invention relates to a holder for radial or other tires of the type which are partially shaped into a generally toroidal form prior to curing.

For years tire manufacturers have been plagued with the problem of the holding and handling of tires from the time they are built on a conventional tire building drum until they are eventually cured in a vulcanizing press. The uncured tire, which is by nature quite soft and pliable, is often subject to deformation while awaiting cure. This deformation, which could be fatal to a quality product, is often caused by the long delays encountered between tire building and tire curing and may be accelerated by the ambient temperature of the plant where the tire is stored and cured.

In the case of a bias ply tire built in the form of a cylinder open at both ends, the problem is not as acute. These tires, if properly stored in a cool place until just prior to curing, will generally be suitable for curing with the possible exception being in their tendency to go out-of-round. Manufacturers, however, have satisfactorily compensated for and corrected the out-of-round condition of these tires by placing them on a tray adjacent the curing press having a circular ring which centers the lower bead area of the uncured tire to restore it to its desired configuration. In addition, conventional automatic loading apparatus for positioning a tire into a curing press normally engages the tire in such a manner as to restore the bias ply tire to its cylindrical shape.

The radial or preformed tire, however, presents a different and more complex problem. These tires, which are built in the final stages in a generally toroidal shape, may have sidewall portions which are extremely flexible. Even if stored in a cool place, when located near a vulcanizing press awaiting just one cure cycle thereof, the radial or preformed tire can severely deform not only to the extent that loading into the tire press becomes difficult, if not impossible, but also to the extent that the alignment and spacing of the fabric cords therein can become critically distorted or the cords may even be pushed through the skim coating to form a defect with the result being that the cured tire manufactured therefrom would be rejected as unfit for operational use or at least be of impaired quality, due to geometric deviations in the final configuration.

Because it is highly desirable to place an uncured tire near or adjacent to a vulcanizing press prior to being cured so that it is readily available to be picked up by conventional press loading equipment, a number of devices have been developed to hold tires of different configurations proximate to a press. For example, apparatus has been developed to hold a preformed tire by its upper bead on a plurality of arm or segment-like supports. Other apparatus attempts to maintain the shape of a preformed tire by utilizing a device which expands vertical segments radially outwardly against both beads of the tire. Still other apparatus places the lower sidewall of the tire on a shelf-like device in addition to holding one or both of the beads as just described.

None of these devices, however, totally and properly support a partially shaped tire. In every instance the stresses placed on the tire could tend to distort the cords thereof. In addition, all of the prior art devices are fixedly attached for use only at a tire press and only tend to minimize at certain critical areas, rather than preclude, the tendencies of the uncured tire to deform. Further, the prior art tire holders often limit the type of loading device which can be utilized with the curing press. Thus, no prior art device is capable of handling and holding a partially shaped tire from the time it is built or a time prior to cure until it is positioned in a press for curing in a geometrically stable condition which is necessary to produce consistently uniform tires.

SUMMARY OF THE INVENTION

An object of the present invention is to provide a tire holding and handling device which will internally engage and support from bead to bead a variety of sizes of tires.

Another object of the present invention is to provide a device, as above, which is adapted for use with curing press loaders which contact and lift an uncured tire both externally in the tread area and internally by the upper bead.

Still another object of the present invention is to provide a device, as above, which can be utilized at the site of the construction of the tire and thereafter transferred by existing equipment with the tire for positioning at or adjacent a tire vulcanizing press.

Yet another object of the present invention is to provide a device, as above, which will prevent deformation of the uncured tire which might distort the cord alignment or alter the relation between the cords and the skin coatings thereon.

A still further object of the present invention is to provide a device, as above, which positions the tire in a manner permitting the facile monitoring or checking of the external dimensional characteristics thereof.

An additional object of the present invention is to provide a device, as above, which includes an expansible member which is inserted into the uncured tire and in the use of an inflated member filled with either air or stream, the use of the latter providing the supplemental effect of a preheating of the uncured tire prior to cure.

These and other objects which will become apparent from the following description are accomplished by the present invention hereinafter described, in a preferred embodiment thereof, and claimed.

In general, a support member, which can be in the form of a hollow post, carries a plate to receive the lower bead of an uncured tire and also carries an expansible member. The expansible member is inserted into the tire so that it contacts substantially the entire inner surface of an uncured tire placed on the plate. An actuating device for the expansible member can be provided at the site where the uncured tire is constructed and/or the support member may be placed on an arm extending from the tire curing press and the expansible member may be inserted into the tire by an actuating device located proximate the press.

BRIEF DESCRIPTION OF THE DRAWINGS

FIG. 1 is an elevational view, partially in section, of a tire holding and handling device according to the FIG. 2 is a fragmentary elevational view taken substantially along line 2—2 of FIG. 1.

DESCRIPTION OF THE PREFERRED EMBODIMENT

Figure 3:
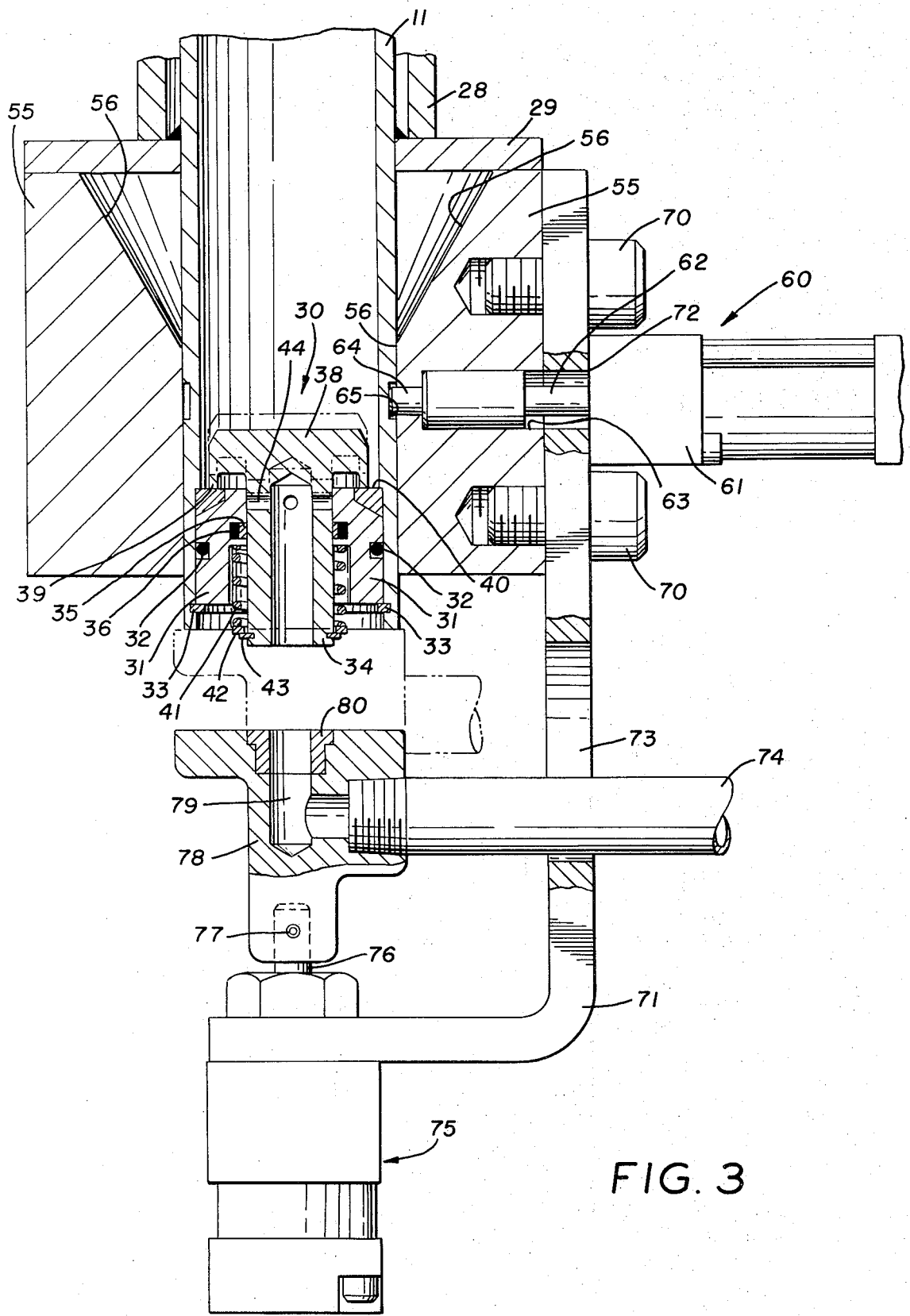
FIG. 3 is a sectional view taken substantially along line 3—3 of FIG. 2.

A tire holding and handling device according to the concept of the present invention is indicated generally by the numeral 10 in FIG. 1 and is shown therein as holding a partially shaped uncured tire T. As shown, holder 10 includes support member 11 which may take the form of a hollow post closed at the top thereof by an insert 12. An upper clamp plate 13 is detachably fixed, as by bolt 14, to insert 12 and includes a collar portion 15 which engages insert 12 and support member 11, which engagement is sealed to the atmosphere by O-ring 16. An upper clamp ring 18 is fixed, as by bolt 19, to the clamp plate 13. Together, the plate 13 and ring 18 hold the upper bead 20 of a resilient or inflatable cylindrical member 21, which can be made of any suitable rubber or other elastomeric material. A compound of the general type employed for tire inner tubes having a thickness on the order of six one hundredths of an inch constitutes one example of a construction of member 21 providing satisfactory operation.

The lower beads 22 of resilient member 21 are clamped between a lower clamp plate 23 and lower clamp ring 24 detachably fixed thereto, as by bolt 25. Plate 23 also includes an annular circumferential lip 26 suitable for receiving the lower bead of a tire T as seen in FIG. 1. Ring 24 has a collar portion 23' and an O-ring 23'' which may be identical to and serve the same purpose as collar 15 and O-ring 16 of upper clamp plate 13. The axial position of the plate 23 and ring 24 relative to upper clamp plate 13 can generally correspond to the bead to bead height of the uncured tire, when a radial ply tire is contemplated, and is regulated and maintained by a spacer 28 which rests between clamp ring 24 and a stop plate 29 which is welded to support member 11, as best shown in FIGS. 1 and 3. It is thus apparent that the holder 10 may be readily adjusted to accommodate tires of varying bead to bead dimensions as constructed in the green or uncured state dependent on the axial length of the spacer 28 selected, which spacer may be changed merely by removing bolt 14 and the upper and lower bead clamping plates 13, 23 hereinabove described.

Ingress and egress of fluid to member 21 is controlled by a valve assembly, indicated generally by the numeral 30 in FIG. 3, which is preferably located inside the lower end of post 11. A generally cylindrical valve body 31 fits within post 11 with O-ring 32 sealing the junction to the atmosphere. A retaining ring 33 holds the body 31 in place within post 11. A generally T-shaped hollow valve stem 34 slides within valve body 31 with a seal consisting of an insert 35 and O-ring 36 closing the junction therebetween. The head 38 of stem 34 includes a downwardly directed annular flange 39 which normally rests on a valve seat 40 of valve body 31.

The head 38 is normally biased against valve seat 40 of body 31 by a coil spring 41 which is mounted between body 31 and a ledge 42 on valve stem 34 and retained in place by ring 43 fixed to the lower portion of stem 34. The hollow stem 34 is provided with ports 44 which, because of spring 41, are normally closed against valve body 31.

The holder just described, or a plurality thereof, could be utilized during or immediately after the construction of the uncured tire to maintain the constructed configuration prior to being placed in a tire vulcanizing press. A flexible tire T is mounted on holder 10 by placing the lower bead thereof on lip 26, the tire T being threaded over the resilient member 21 which at this time reposes in its uninflated chain line position of FIG. 1. The valve stem 34 is moved upwardly to the chain line position of FIG. 3, as by the mechanical actuation hereinafter described, so that air or steam can be introduced through ports 44 and into post 11. Ports 45, near the top of post 11 (FIG. 1), allow this fluid to be introduced into the generally cylindrical member 21 permitting the expansion thereof to totally fill the tire T, thereby contacting substantially the entire inner portion thereof, as shown in FIG. 1. It has been found that a relatively low pressure within member 21 on the order of 7 p.s.i., is sufficiently high to bring member 21 into contact with the entire inner periphery of a tire such as to overcome distortion induced by gravity or by prolonged storage but not so high as to cause distortion of the tire beyond its original configuration as constructed. During this inflation as shown in FIG. 1, plates 13 and 23 remain spaced a distance generally corresponding to the bead to bead height of the radial ply tire. The tire so engaged by holder 10 may then be transported to the curing room and placed adjacent or outside a tire curing press as will hereinafter be described. Or, as will become evident, the holder 10 may be permanently stationed at the tire curing press and the uncured tire merely transferred thereto similar to that which has been done in the past and there mounted.

As best shown in FIGS. 1 and 3, an exemplary tire curing press, a portion thereof being schematically shown as P, may have a holder positioning and inflation assembly, indicated generally by the numeral 50, adjacent thereto. Assembly 50 can be placed near the press P, can be connected thereto as shown in FIG. 1, or could be associated with a loading device. A support arm 51 has a clevis bracket 52 fixed to one end thereof which is engaged by a pin 53 of a hinge assembly, indicated generally by numeral 54 and mounted on press P.

The outer end of arm 51 carries a holder support block 55 having a funnel-shaped recess or aperture 56 therein. As best seen in FIG. 3, the lower end of post 11 is guided into recess 56 to position spacer 28 generally between positioning arm 51 and plate 23. Post 11 is held in place by a locking assembly, indicated generally by the numeral 60. A power cylinder 61 has a piston rod 62 which slides in bore 63 of block 55. A locking projection 64 of rod 62 selectively engages an annular slot 65 in post 11 thereby holding the post 11 and its associated members in a fixed axial position when piston 61 extends projection 64 into slot 65. Since the arm 51 may swing on hinge 54, the holder 10 may be placed in a precise position for use in conjunction with a press loader in a manner hereinafter described.

Fixed to block 55, as by bolts 70, is an L-shaped mounting plate 71. The upstanding branch of plate 71 includes an aperture 72 for the free passage of piston rod 62 of cylinder 61 and a slot 73 through which passes an air or steam line 74 for inflation of the member 21. Mounted on the bottom branch of plate 71 is a cylinder, indicated generally by the numeral 75, whose piston rod 76 is fixed to a valve actuating block 78 as by a pin 77. Line 74 may be threaded into block 78 and communicates with an air passage 79 therein. Upon the upward stroking of cylinder 75 to the chain line position in FIG. 3, an insert 80 in block 78 engages the bottom of valve stem 34, overcomes the spring 41, and moves valve stem 34 upwardly to open the valve 30 and permit the inflation of tube 21.

As described hereinabove, the holder assembly 10 may already have member 21 inflated and engaging a tire T when placed in the support and inflation assembly 50. Alternatively, each press P may be supplied with a single holder assembly 10, or two holder assemblies in connection with a dual press, with uncured tire bands being mounted thereon preparatory to curing. In this instance, the uncured partially shaped tire T is guided over the deflated member 21 and placed on lip 26. Then, actuation of cylinder 75 to the chain line position of FIG. 3 permits entry of pressurized fluid through valve 30 from line 74 to expand member 21 into engagement with the tire T internally substantially from bead to bead, as shown in FIG. 1. If desired steam may be used to inflate the tube 21, whereby a degree of preheating of the tire will take place prior to placement in the curing press.

Figure 5:
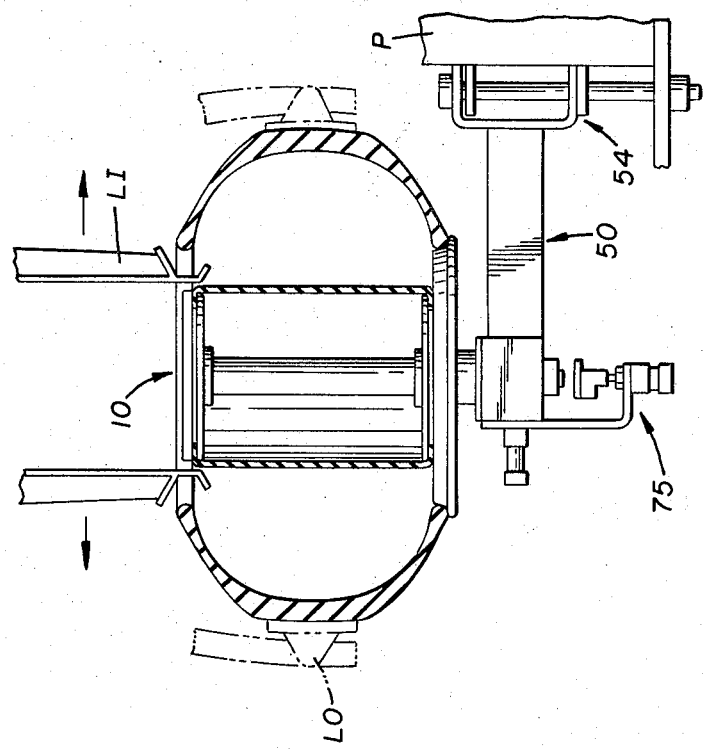
FIG. 5 is a view sequentially following FIG. 4, with the expansible member retracted from the tire preparatory to removal of the tire from the holding and handling device by the loader.
Figure 4:
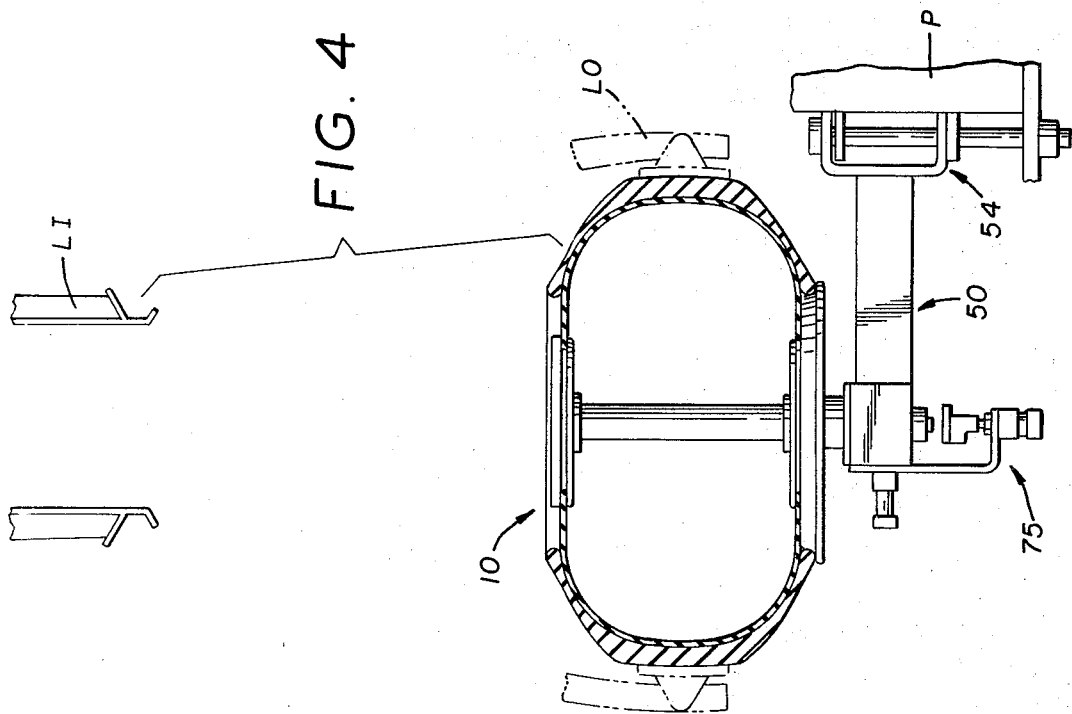
FIG. 4 is a view similar to FIG. 1 showing the universal capability of the tire holding and handling device for employment with exemplary devices which load the tires into the vulcanizing press by gripping on the outside at the tread area and on the inside at the upper bead area, with the expansible member inserted in the tire.

The manner in which the holder 10 may be utilized with conventional press loading devices is best shown in FIGS. 4 and 5. Devices which automatically load preformed tires into the mold of a tire curing press are generally of two types, both being shown in FIGS. 4 and 5, for purposes of illustration, it being understood that only one such loading device would be used at any one time. In one instance the tire is gripped internally at the upper bead area by a radial or arcuate expansion of a plurality of paddles indicated by LI in the drawings. Alternatively, the external tread area of a tire may be gripped by paddle members LO. If the outside grip by paddles LO is utilized, the loader may contact the tire T while the tube 21 is still engaging the internal portions thereof, as shown in FIG. 4. Then, when the press signals the loader to lift the tire into the mold cavity, the cylinder 75 strokes to the chain line position of FIG. 3 to exhaust the member 21. In this instance, a conventional solenoid valve (not shown) in line 74 permits the inflation medium to be exhausted through valve 30. The loader paddles LO may then lift the tire off lip 26 (from the position shown in FIG. 5) and another uncured tire may be placed thereon.

If the inner upper bead gripping paddles LI are used, the member 21 is first exhausted (chain line position of FIG. 1) and then the segments are moved into the space between the clamping members 13 and 18 of the upper bead of the member 21 and the upper bead of the uncured tire as shown in FIG. 5. Expansion of the loader paddles LI to engage the upper bead of the tire then enables the loader to lift the tire off lip 26 by moving vertically upwardly. So long as loader paddles LI engage the upper bead of the tire according to normal operational sequencing of equipment of this type after exhausting the member 21, there is insufficient distortion of the unsupported tire T to adversely affect the loading operation. The holder 10 is thus universally adaptable to a variety of the commonly used loading devices for preformed tires.

It should thus be evident that the tire holding device described herein is capable of being utilized to totally internally engage a tire immediately after it is built or at a tire curing press, can be used with any conventional loading device, avoids distortion of the tire, and otherwise accomplishes the objects of the present invention to substantially improve the tire holding art.

I claim:

1. Apparatus for holding and positioning an uncured tire, prior to being placed in a vulcanizing press, with the components of the tire including the upper and lower beads maintained substantially undistorted comprising, engaging means selectively expandable into the tire to contact the inner portion thereof from substantially the upper bead to the lower bead, first plate means for holding one end of said engaging means, second plate means for holding the other end of said engaging means and for receiving a bead of the tire, stationary support means at least partially within said engaging means and carrying said first and second plate means, said first and second plate means being axially spaced so that said engaging means, when in its unexpanded condition, is in a substantially cylindrical form and is of an axial height substantially corresponding to the bead to bead height of the uncured tire, and means to expand said engaging means into the tire to contact the inner portion thereof while maintaining said first and second plate means spaced a distance substantially corresponding to the bead to bead height of the uncured tire.

2. Apparatus according to claim 1 including means carried by said support means controlling expansion of said engaging means.

3. Apparatus according to claim 2 wherein said engaging means is an inflatable member and said means controlling expansion of said engaging means is a valve.

4. Apparatus according to claim 1 wherein said engaging means is of a diameter when in an unexpanded condition less than the bead diameter of the uncured tire to present a space therebetween for the positioning of a tire loading device.

5. Apparatus according to claim 1 wherein said support means is in the form of a hollow post.

6. Apparatus according to claim 5 including normally closed valve means in said hollow post.

7. Apparatus according to claim 1 including positioning means located at a tire curing press for holding said support means.

8. Apparatus according to claim 7 wherein said positioning means is hingedly attached to the press for selective positioning relative thereto.

9. Apparatus according to claim 7 including means to lock said support means in said positioning means.

10. Apparatus according to claim 7 wherein said support means is a hollow post having normally closed valve means near the bottom thereof.

11. Apparatus according to claim 10 including means to open said valve means to introduce pressurized fluid into said post, said post having an aperture therein to permit said pressurized fluid to communicate with the inside of said engaging means to expand the same.

12. Apparatus according to claim 11, said means to open said valve means having a passage therein, and including a supply line for the pressurized fluid, said supply line communicating with one end of said passage and the other end of said passage communicating with said valve means.

13. Apparatus for holding and positioning an uncured tire, prior to being placed in a vulcanizing press, with the upper and lower beads of the tire being maintained substantially undistorted and selectively positioned outside the press comprising, engaging means selectively expandable into the tire to contact the inner portion thereof from substantially the upper bead to the lower bead, stationary support means extending into and removably carrying said engaging means, plate means extending around said support means for carrying said tire, positioning means outside the press removably carrying said support means, and a spacer means, selected from a plurality of spacer means of varying heights, and positioned between said positioning means and said plate means to position said plate means at a preselected axial position along said support means to accommodate varying types of uncured tires.

* * * * *